US010099630B1

(12) United States Patent
Krishnan et al.

(10) Patent No.: US 10,099,630 B1
(45) Date of Patent: Oct. 16, 2018

(54) VEHICLE SENSOR MOUNT

(71) Applicant: Ford Global Technologies, LLC, Dearborn, MI (US)

(72) Inventors: Venkatesh Krishnan, Canton, MI (US); Rashaun Phinisee, Ypsilanti, MI (US); Paul Kenneth Dellock, Northville, MI (US); Roger Petrey, Rochester Hills, MI (US); Harry Lobo, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/637,103

(22) Filed: Jun. 29, 2017

(51) Int. Cl.
*B60R 11/04* (2006.01)
*B60Q 1/00* (2006.01)
*E05F 15/44* (2015.01)
*B60J 10/00* (2016.01)

(52) U.S. Cl.
CPC ............ *B60R 11/04* (2013.01); *B60Q 1/0023* (2013.01); *E05F 15/443* (2015.01); *B60J 10/00* (2013.01); *B60R 2300/108* (2013.01); *B60R 2300/301* (2013.01); *E05Y 2900/55* (2013.01)

(58) Field of Classification Search
CPC ..... B60R 11/04; B60R 11/11; B60R 11/0258; B60R 2300/108; B60R 2300/301–2300/23
USPC ..................................................... 296/201, 3
See application file for complete search history.

(56) References Cited

U.S. PATENT DOCUMENTS

| 7,218,745 | B2 | 5/2007 | McConnell et al. |
| 7,429,958 | B2 | 9/2008 | Lindackers et al. |
| 7,697,028 | B1* | 4/2010 | Johnson .................. B60R 1/00 348/113 |
| 8,646,823 | B2 | 2/2014 | Mehs et al. |
| 2007/0090139 | A1 | 4/2007 | McKenzie |
| 2013/0261873 | A1* | 10/2013 | Pal .......................... E21B 47/042 701/28 |
| 2013/0278715 | A1* | 10/2013 | Nutsch ............... H04N 5/23238 348/38 |
| 2016/0236725 | A1 | 8/2016 | Shirai |
| 2017/0028936 | A1 | 2/2017 | Matsumoto |
| 2017/0305360 | A1* | 10/2017 | Zajac ...................... B60R 11/04 |
| 2017/0369106 | A1* | 12/2017 | Williams ............... B62D 35/00 |

(Continued)

FOREIGN PATENT DOCUMENTS

| CN | 100999198 A | 7/2007 |
| CN | 205293105 U | 6/2016 |
| CN | 106240433 A | 12/2016 |

(Continued)

OTHER PUBLICATIONS

Brandon, "Meet the Founder Trying to Start the Self-Driving Car Revolution", Inc.com, Mar. 22, 2017, http://www.inc.com/magazine/201502/john-brandon/the-new-cruise-control-kyle-vogt-cruise-automation.html.

*Primary Examiner* — Dennis H Pedder

(74) *Attorney, Agent, or Firm* — Frank A. MacKenzie; Bejin Bieneman PLC

(57) ABSTRACT

A sensor mount system for a vehicle is disclosed. The system includes a sensor cover having a plurality of walls defining a cavity, wherein at least one of the plurality of walls comprises a window; and a movable rack, within the cavity, having a platform, wherein, when the rack is in an operative position, a location of the platform corresponds with a location of the window.

20 Claims, 11 Drawing Sheets

(56) References Cited

U.S. PATENT DOCUMENTS

2018/0015886 A1* 1/2018 Frank .................... B60R 11/04
2018/0037267 A1* 2/2018 Williams ............... B62D 25/06

FOREIGN PATENT DOCUMENTS

| EP | 3034359 A1 | 6/2016 |
| FR | 2910849 A1 | 7/2008 |
| KR | 1020160066278 A | 6/2016 |

* cited by examiner

US 10,099,630 B1

VEHICLE SENSOR MOUNT

BACKGROUND

Vehicle sensors may be mounted in a variety of locations. For example, sensing equipment may be located in a vehicle grill, adjacent vehicle headlamps, etc.—e.g., for detecting nearby vehicles or objects.

DETAILED DESCRIPTION

Figure 1:
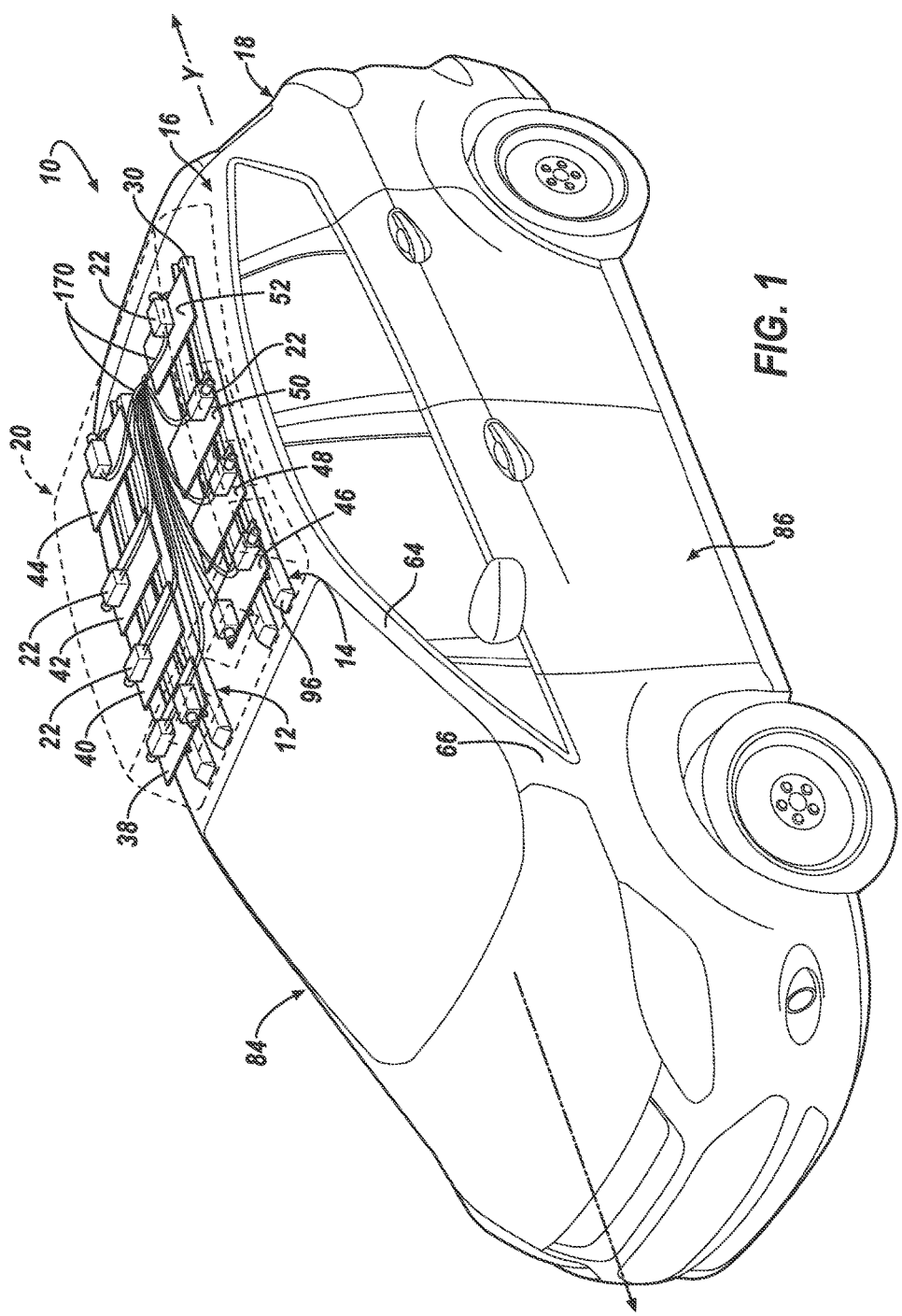
FIG. 1 is a perspective view a sensor mount system located on a roof, wherein a cover of the system is in phantom to show a pair of sensor mounting racks.
Figure 2:
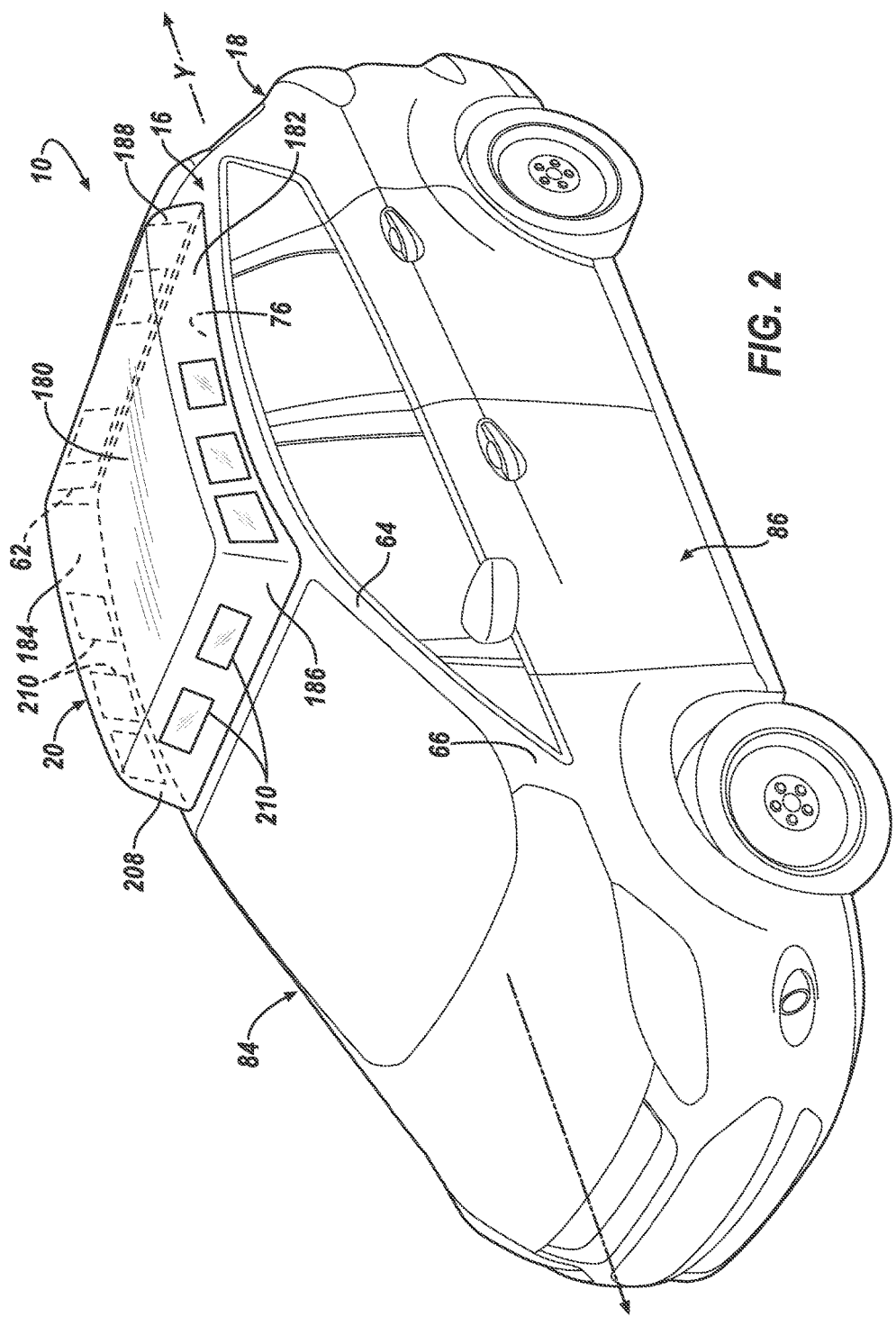
FIG. 2 is another perspective view of the system, wherein the sensor mounting racks are hidden to better illustrate the cover.

A sensor mount system is disclosed. According to one illustrative example, the system includes: a sensor cover having a plurality of walls defining a cavity, wherein at least one of the plurality of walls comprises a window; and a movable rack, within the cavity, having a platform, wherein, when the rack is in an operative position, a location of the platform corresponds with a location of the window.

According to the at least one example set forth above, the rack includes a plurality of platforms, wherein the cover includes a plurality of windows, wherein, when the rack is in the operative position, the respective locations of the platforms correspond to the respective locations of the windows.

According to the at least one example set forth above, the cover includes an opening for a door, wherein, when the door is in an open position, the rack is movable through the opening to a service-able position.

According to the at least one example set forth above, the door includes a locking mechanism that couples to the movable rack.

According to the at least one example set forth above, the rack further includes a slide rail for supporting a sensor, the rail comprising a lock element, wherein the mechanism engages the element to retain the door in a locked position.

According to the at least one example set forth above, the system includes a first movable rack and a second movable rack, wherein the first movable rack moves independently of the second movable rack.

According to the at least one example set forth above, each of the first and second movable racks include at least one sensor which provides data to a computer programmed to operate a vehicle, comprising the system, in a fully autonomous mode.

According to the at least one example set forth above, the rack includes at least one slide rail coupled to the platform and at least one guide rail, wherein the at least one slide rail moves relative to the at least one guide rail.

According to the at least one example set forth above, the system further includes a vehicle roof comprising a plurality of cross-members, wherein the at least one guide rail is coupled to at least some of the plurality of cross-members.

According to the at least one example set forth above, at least one of the plurality of cross-members is a non-pillared cross-member.

According to the at least one example set forth above, the system includes a first rack and a second rack, wherein each of the first and second racks comprise a pair of guide rails and a pair of slide rails, wherein the first rack is arranged as a mirror-image of the second rack.

According to the at least one example set forth above, the at least one guide rail is coupled to a first wall of the cover, wherein the at least one slide rail is movable through an opening in a second, opposite wall.

According to the at least one example set forth above, the at least one slide rail includes a hinge-able segment so that, when the rack is in a service-able position, a first portion of the at least one slide rail is pivoted relative to a second portion thereof.

According to the at least one example set forth above, the cover includes at least one fluid nozzle positioned to apply a fluid to the window.

According to the at least one example set forth above, the window includes at least one of the following: an acrylic material, a polycarbonate material, an Indium Antimonide material, or a heating element.

According to the at least one example set forth above, the cover includes a display.

According to another illustrative example, the system includes: a cover having a plurality of walls defining a cavity, wherein at least one of the plurality of walls comprises a window; and a sensor mounting rack, located within the cavity, coupled to both a roof of a vehicle and the cover, having a platform, wherein, when the rack is in an operative position, a location of the platform corresponds with a location of the window.

According to the at least one example set forth above, the rack includes a plurality of sensors, wherein the cover includes a plurality of windows, wherein, when the rack is in the operative position, the respective locations of the sensors correspond to the respective locations of the windows.

According to the at least one example set forth above, the cover includes an opening for a door, wherein, when the door is in an open position, the rack is movable through the opening to a service-able position.

According to the at least one example set forth above, the system includes a plurality of racks, wherein each of a first rack and a second rack comprise a pair of guide rails and a pair of slide rails, wherein the first rack is arranged as a mirror-image of the second rack.

According to the at least one example, a method is disclosed which includes servicing the sensors carried by at least one sensor mounting rack, according to any combination of the examples set forth above.

Figure 4:
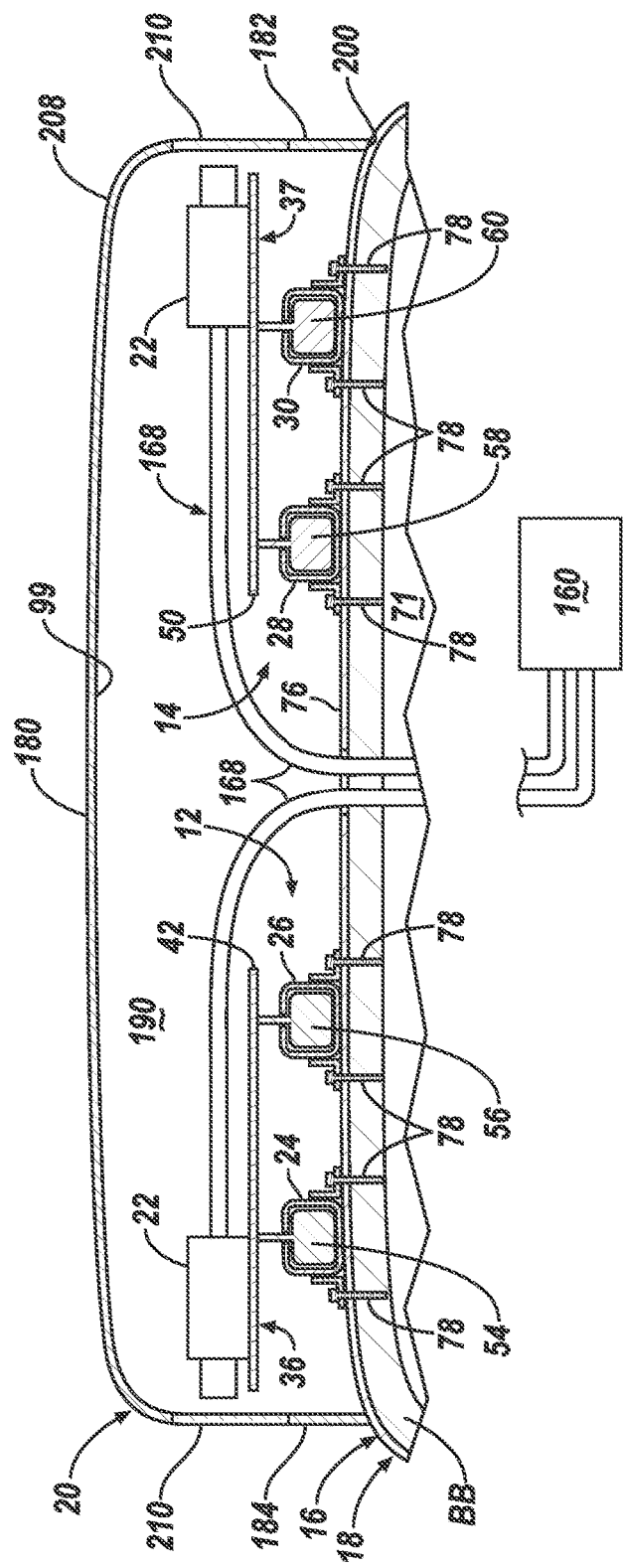
FIG. 4 is a sectional view of the sensor mount system.

Now turning to the figures, wherein like numerals indicate like parts throughout the several views, there is shown a sensor mount system 10 that includes one or more sensor mounting racks 12, 14 located on a roof 16 (of a vehicle 18), and a sensor cover 20 enclosing the rack(s)—e.g., the rack(s) 12, 14 and/or cover 20 being coupled to the roof 16. One or more sensors 22 may be mounted to the rack(s) 12, 14; and data received from these sensors 22 may be used to drive the respective vehicle 18 in a fully autonomous mode. As will be described in greater detail below, the rack(s) 12, 14 may comprise one or more first or guide rails 24-26, 28-30 (e.g., two pairs are shown) and one or more carriages 36, 37. For example, carriage 36 may comprise one or more sensor mounting platforms 38, 40, 42, 44 and one or more second or slide rails 54-56, and carriage 37 may comprise one or more sensor mounting platforms 46, 48, 50, 52 and one or more second or slide rails 58-60 (e.g., see FIGS. 1, 4). As described more below, slide rails 54-56 may move relative to guide rails 24-26, and slide rails 58-60 may move relative to guide rails 28-30 (e.g., allowing respective translational movement). To service the sensors 22, the cover 20 may comprise a door 62 that moves between an open position and a closed position, and the carriages 36, 37 independently may move between an operative position (e.g., within the cover 20) and a service-able position (e.g., extending at least partially from the cover 20 via the door 62). In this manner, an authorized user can open the door 62 (to the open position) to access the sensors 22, draw the carriage 36 outside of the cover 20 to the service-able position, and perform repair, replace, or other maintenance work on the sensors 22. Thereafter, the user may push the carriage 36 back into the cover 20 to the operative position and then secure the carriage 36 by moving the door 62 to the closed position. In the closed position, the sensors 22 may be protected from theft and from the environment (e.g., including dust, dirt, rail, ice, extreme temperatures, etc.).

Referring to FIG. 1, the vehicle 18 is shown as a passenger car; however, vehicle 18 could also be a truck, sports utility vehicle (SUV), recreational vehicle, bus, train, marine vessel, aircraft, or the like that includes the sensor mount system 10. Vehicle 18 may be operated in any one of a number of autonomous modes—e.g., operating in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 18. For example, at level 0 ("no automation"), a human driver is responsible for all vehicle operations. At level 1 ("driver assistance"), the vehicle 18 sometimes assists with steering, acceleration, or braking, but the driver is still responsible for the vast majority of the vehicle control. At level 2 ("partial automation"), the vehicle 18 can control steering, acceleration, and braking under certain circumstances without human interaction. At levels 3-5, the vehicle 18 assumes more driving-related tasks. At level 3 ("conditional automation"), the vehicle 18 can handle steering, acceleration, and braking under certain circumstances, as well as monitoring of the driving environment. Level 3 may require the driver to intervene occasionally, however. At level 4 ("high automation"), the vehicle 18 can handle the same tasks as at level 3 but without relying on the driver to intervene in certain driving modes. At level 5 ("full automation"), the vehicle 18 can handle all tasks without any driver intervention.

According to at least one example, the vehicle 18 may comprise a vehicle body 64 that includes the vehicle roof 16, discussed above. For example, the vehicle body 64 may support the vehicle 18, and may be of a unibody construction in which at least some of the body 18 is exposed and may present a class-A surface 66. The class-A surface 66 may be one in which the surface specifically is manufactured to have a high-quality, finished aesthetic appearance free of blemishes. Alternatively, the body 64 may be of a body-on-frame construction, or of any other suitable construction. Further, the body 64 may be formed of any suitable material, for example, steel, aluminum, etc.

Figure 3:
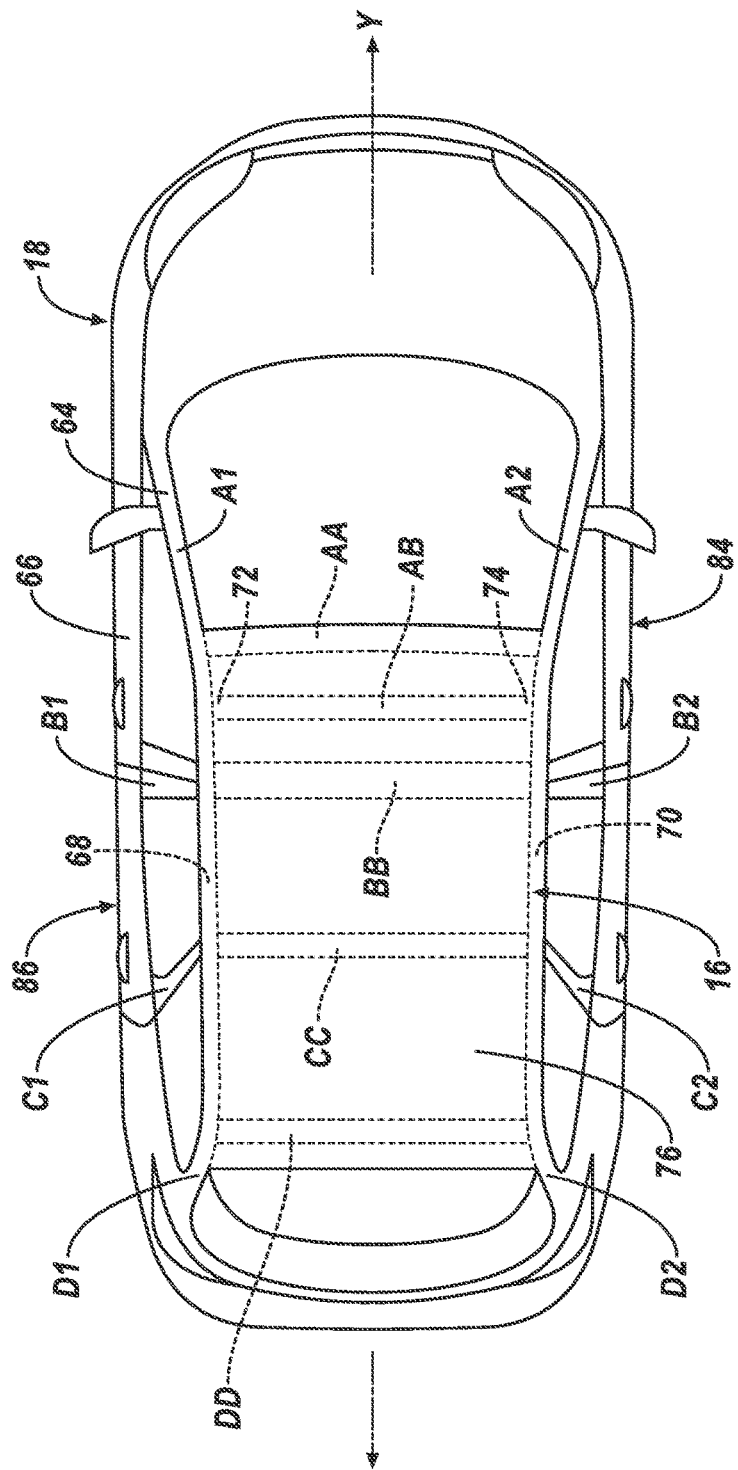
FIG. 3 is a top view of the vehicle shown in FIGS. 1-2, illustrating structural members of the roof.

As best shown in FIG. 3, the roof 16 may comprise two axially-extending side members 68, 70 (with respect to a longitudinal axis Y of the vehicle 18); and the spacing of side members 68, 70 may define a width of the roof 16. The side members 68, 70 may extend from a pair of forward-most pillars (e.g., labeled pillars A1, A2) to a pair of rearward-most pillars (e.g., labeled pillars D1, D2). One or more sets of pillars (e.g., labeled B1, B2 and C1, C2) may be interposed therebetween, also coupling to the respective side members 68, 70. The quantity of pillars may vary depending on the vehicle configuration (e.g., some configurations may have only one, two, or three pairs of pillars, while other configurations may have five or more pairs of pillars). Conventionally, the side members 68, 70 and pillars A1-A2, B1-B2, C1-C2, D1-D2 may form a portion of the body 64 of the vehicle 18. In general, the shape, size, and position of the side members 68, 70 and respective pillars A1-A2, B1-B2, C1-C2, D1-D2 may define a volume of a vehicle cabin 71, as will be appreciated by skilled artisans.

The roof 16 and body 64 further may comprise one or more cross-members. In the illustrated example, a cross-member AA may extend between the A-pillars, a cross-member BB may extend between the B-pillars, and a cross-member CC may extend between the C-pillars. In at least some examples, one or more additional cross-members (e.g., such as AB) may extend between the side members 68, 70 as well. For instance, in the illustrated example, the respective ends 72, 74 of cross-member AB may not coincide with the coupling of pillars to the side members 68, 70. For example, cross-member AB may be spaced between cross-members AA and BB—e.g., cross-member AB may be coupled to so-called sport or assist grips (not shown) within the cabin 71 (e.g., typically located above and proximal to vehicle seating).

The roof 16 further may comprise a portion 76 of surface 66, described above—e.g., overlaying and being coupled to the side and/or cross-members 68, 70, AA, AB, BB, CC, DD. As will be described in greater detail below, the sensor mount system 10 may be coupled to one or more of the cross-members AA, AB, BB, CC, DD (e.g., the surface may have a plurality of coupling features 78 enabling the sensor mount system 10 to be attached to the roof 16 in a manner to sufficiently minimize shock and vibration at the sensors), as will be explained in greater detail below. Non-limiting examples of coupling features 78 include through holes, threaded holes, machine screws, bolts, clips, clasps, brackets, etc.

As described above, the sensor mount system 10 may comprise one or more sensor racks 12, 14 which may be coupled to the cross-members AA, AB, BB, CC, DD of the roof 16. In at least one example the rack(s) 12, 14 are only coupled to two or three cross-members (e.g., AB, BB, and CC). In other examples, additional cross-members (e.g., AA and/or DD) may also be used. Coupling to fewer cross-members may be associated with smaller rack sizes and a minimization of vehicle weight. In at least one example, the racks 12, 14 are coupled to at least two cross-members to minimize vibrational inputs to the sensors 22 so as to not compromise sensor performance. Further, coupling to a non-pillared cross-member such as cross-member AB may reduce the size or the spatial footprint of the sensor mount system 10 as well—e.g., providing structural stability, while minimizing the system's spatial footprint (as used herein, a non-pillared cross-member is a structural support which extends between and couples to at least two side members 68, 70 in a region that does not correspond to the coupling of vehicle pillars (e.g., such as pillars A1, A2, B1, B2, C1, C2, D1, D2)).

In the illustrations, two sensor racks 12, 14 are shown as a non-limiting example. As described more below, each sensor rack 12, 14 may support one or more sensors 22, and each rack 12, 14 may move independently with respect to one another. In at least one example, each rack 12, 14 may be identical; therefore, only one will be described.

According to one example, sensor rack 14 may comprise a pair of guide rails 24-26 which may be coupled to the cross-members AB, BB, CC of the roof 16 (as described above) and a carriage 37 that carries one or more autonomous driving sensors 22 (e.g., five sensors 22 are shown on carriage 37). The pair of guide rails 28-30 may be spaced from one another and may be positioned so that they extend axially with respect to the vehicle 18 (e.g., they may be parallel to axis Y). Where two racks (e.g., 12, 14) are employed (as in the illustrations), rack 12 may be positioned radially outboard of axis Y (e.g., toward a starboard side 84 of vehicle 18), and rack 14 may be positioned radially outboard of axis Y (e.g., toward a port side 86 thereof). Each guide rail 28, 30 may be identical; therefore, only one will be described herein.

Guide rail 30 may have an elongated body 90 wherein one side 92 has a slot 94 axially extending at least partially the length thereof. In the illustrated example, the body 90 is straight and a cross-section of the body 90 has a rectangular shape (e.g., with filleted interior and exterior corners), wherein the slot 94 is located at an upper side (92); however, this is merely an example (e.g., other shapes are possible (e.g., including oval, circular, trapezoidal, etc. shapes), and other slot arrangements are also possible). A first end 96 of the guide rail 30 may be positioned vehicle-forwardly (being coupled to the cover 20), while a second, opposite end 98 of the guide rail 30 may be positioned vehicle-rearwardly (e.g., suitably spaced from an inner surface 99 of the cover 20). In one example, the second end 98 is open, and the slot 94 extends to the second end 98—e.g., so that the carriage 37 may be slidably coupled to the guide rail 30, as explained in greater detail below.

Each side 100 of the guide rail may comprise a plurality of brackets 102 and fasteners 104. For example, the brackets 102 and fastener 104 may retain the guide rail 30 to the cross-members AB, BB, CC (e.g., by locating fasteners 104 into the corresponding coupling features 78 on the roof 16).

As described above, carriage 36 may comprise a pair of slide rails 54-56 and platforms 38-44, and carriage 37 may comprise a pair of slide rails 58-60 and platforms 46-52. Each slide rail may be similar or identical; therefore, only one will be described herein. Slide rail 60 may comprise an elongated body 110 and a coupler 112 which couples the slide rail 60 to platforms 46-52. According to at least one example, the body 110 of the slide rail 54 may have a similar shape as a corresponding guide rail 30 (e.g., a rectangular shape with rounded exterior corners); however, a diameter of the slide rail 60 may be less than an inner diameter of the guide rail 30 so that the slide rail 60 may move within the guide rail 30 without interference. Of course, other cross-sectional shapes are also possible—e.g., including shapes which correspond to the shape of the respective guide rail (and shapes which do not).

Figure 5:
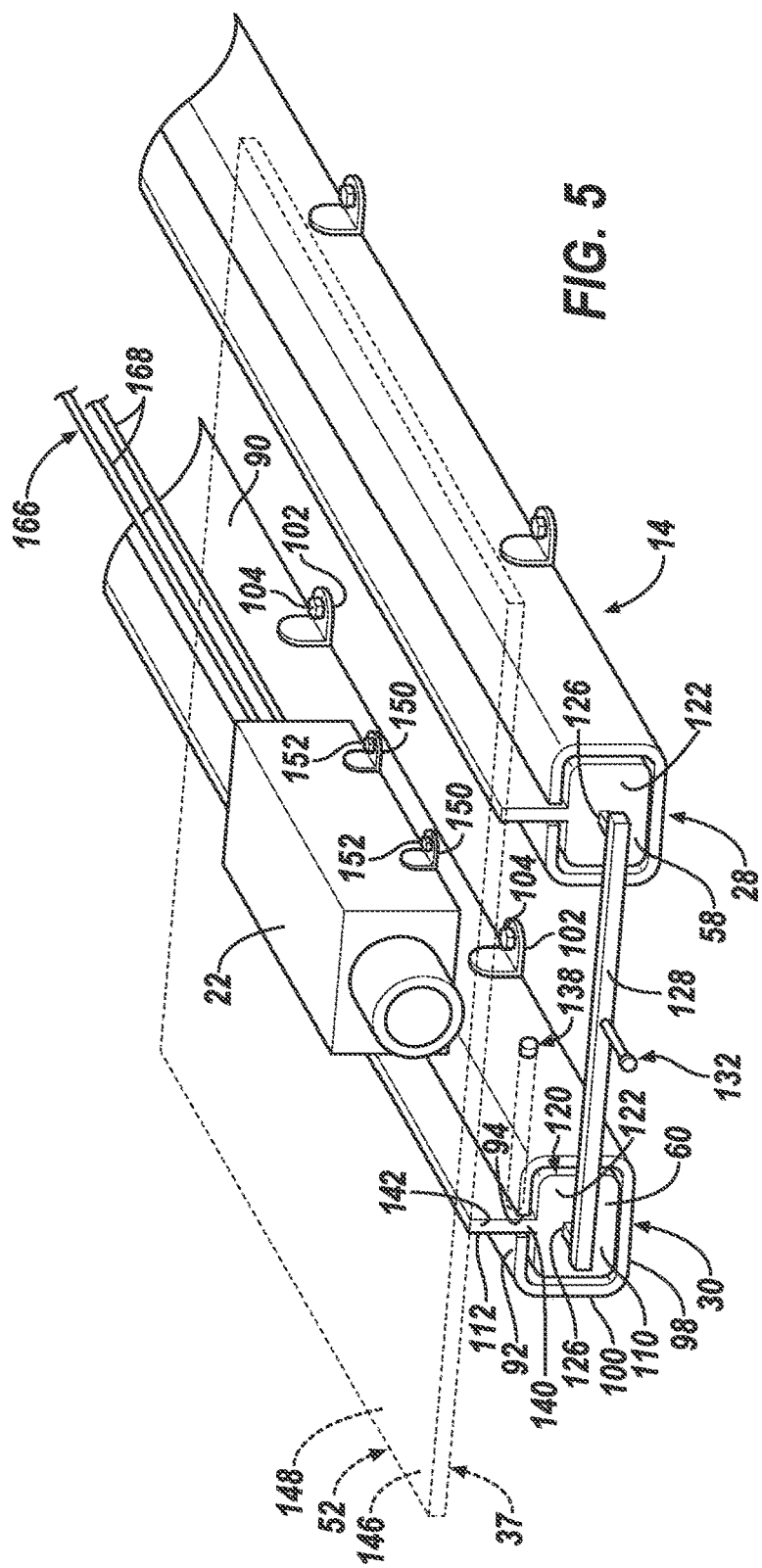
FIG. 5 is a partial perspective view of a sensor rack of the system.
Figure 6:
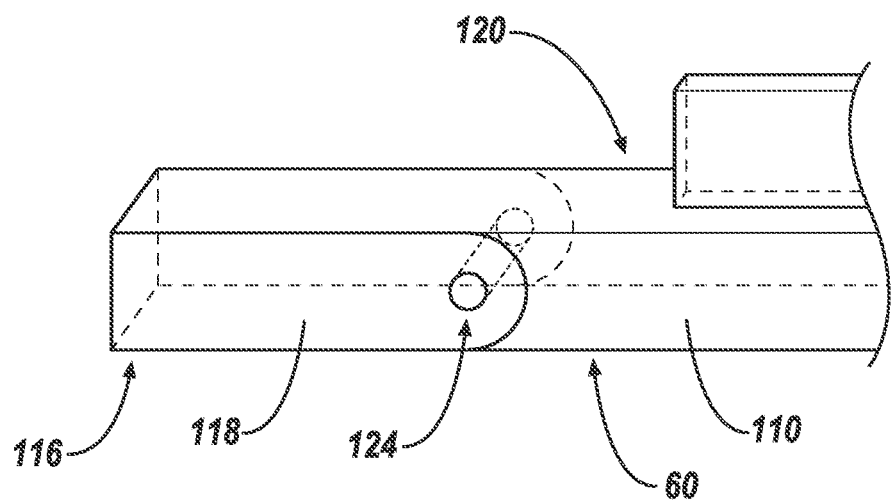
FIG. 6 is a perspective view of a portion of a slide rail of the sensor rack.

As shown in FIGS. 5-6, slide rail 60 may comprise a first portion 116 having a hinge-able segment 118 (e.g., positioned vehicle forwardly within the guide rail 30) and a second portion 120 which is pivotably-coupled to the first portion 116 and extends to an end 122 (e.g., positioned vehicle rearwardly). A hinging element 124 of the segment 118 may be any suitable hinging mechanism (e.g., including but not limited to shaft and sleeve arrangements known in the art). As will be explained in greater detail below, when the slide rail 60 is withdrawn from the guide rail 30, the hinge-able segment 118 may permit the second portion 120 to fold downwardly to the ground while the segment 118 remains located in the guide rail 30. In this instance, the first and second portions 116, 120 serve as a stand—e.g. the stand being propped between the ground and the guide rail 30 (e.g., and guide rail 28)—e.g., so that an authorized user may access the sensors 22 on carriage 37 and may perform replacement, repair, or other suitable maintenance thereto.

Figure 7:
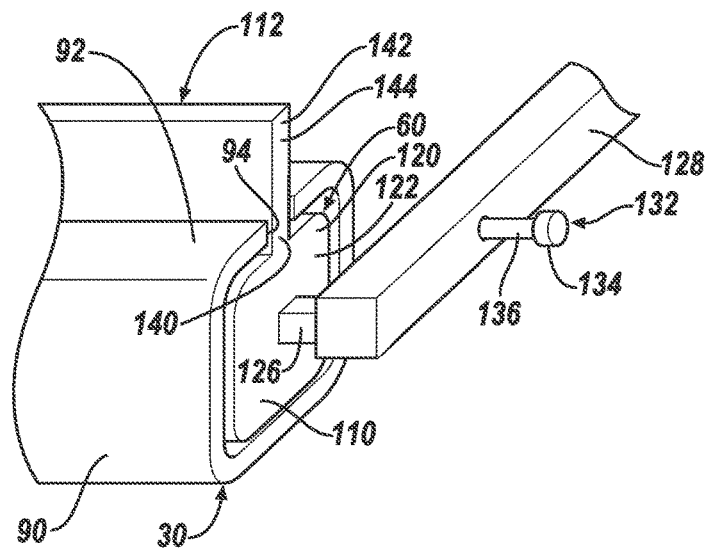
FIG. 7 is a perspective view of a handle for the slide rail.

As best shown in FIGS. 5 and 7, feet 126 of a handle 128 may be coupled to respective ends 122 of slide rails 58, 60. Thus, the authorized user may grip the handle 128 and slide the carriage 37 from a first or operational position to a second or service-able position. A lock element 132 may extend axially from the handle 128; here, the element 132 is shown as a lock pin; however, other examples also exist. According to one non-limiting example, element 132 may comprise a bulbous head 134 and a shaft 136 which couples the head 134 to the handle 128. As will be explained in greater detail below, the cover 20 may comprise a lock mechanism which receives the element 132 to secure the door 62 in a closed and locked position.

In at least some examples, the slide rail 60 and guide rail 30 have a locking feature 138 that retains the respective positions of the slide rails 58-60 relative to the guide rails 28-30—e.g., in addition to the lock element 132 and lock mechanism. One non-limiting example of such a locking feature 138 includes a cotter pin and transversely-alignable holes in each of the guide rail 30 and slide rail 60—e.g., holes which can be aligned when the carriage is in the operational position (e.g., at least one hole in one of the slide rails 58, 60 and at least one correspondingly-alignable hole in the respective guide rail 28, 30). Thus, the authorized user may release the locking feature 138 and then pull handle 128 to withdraw the carriage 36 from the cover 20. This is merely an example; other locking feature examples will be appreciated by skilled artisans.

The coupler 112 (of the slide rail 60) may comprise any component which suitably connects the slide rail 60 to platforms 46-52 and which allows translational movement with respect to the guide rail 30. One non-limiting example of a coupler 112 is a beam which extends at least partially along the length of the slide rail 60 (e.g., stopping short of the hinge-able segment 118). A lower end 140 of the coupler 112 may be coupled to the slide rail body 110, and an upper end 142 of the coupler 112 may be coupled to platforms 46-52. A middle portion 144 of coupler 112 may extend between the lower and upper ends 140, 142 and may be sized to move longitudinally within the slot 94 of the guide rail 30 without interference.

Figure 5A:
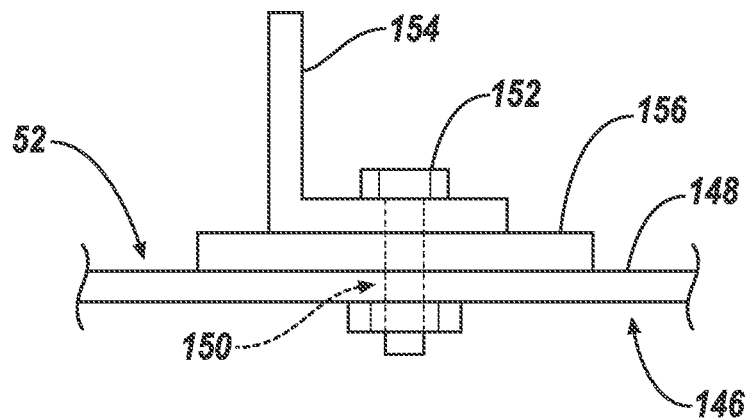
FIG. 5A is a mounting feature for a guide rail of the sensor rack.

According to at least some examples, each rack 12, 14 comprises multiple platforms. Each platform 46-52 of rack 14 may be similar or identical; therefore, only one platform will be described. As used herein, a platform is any bracket having one or more bends, depressions, and/or protrusions and/or one or more through holes, slots, or additional features for coupling, to at least one of the slide rails, at least one of the following autonomous driving sensors 22: a digital camera, a thermal imaging device, a radar device, a light ranging and detection (LiDAR) device, a laser range finder, a laser pointing device, or an illuminator operating in the visible and/or non-visible wavelengths. The platform 52 may comprise a bracket 146 having any suitable features for mounting at least one sensor 22. Further, according to at least one example, the platform 52 also couples the respective pair of slide rails together (e.g., slide rails 58-60) so that they move in unison. In the illustrated example (see also FIG. 5A), the bracket 146 includes a flat base 148 having one or more through holes 150 through which fastener(s) 152 can retain at least one respective sensor 22. In at least one example, an L-bracket 154 and an isolator 156 are used to minimize vibration between the sensor 22 and the vehicle 18. This is merely one example; other platform and retention configurations or arrangements can be used.

For instance, according to another example, the platform 38 may comprise bends, depressions, protrusions, holes, slots, etc. in or on the slide rail coupler 112 or the slide rail body 110—e.g., the platform may not have a base 148. In such examples, the slide rails (e.g., 54-56 or 58-60) may be coupled to one another by other means (e.g., a bracket or cross-member) that facilitates the pair of slide rails moving in unison. Still other examples exist as well.

In at least one example, several platforms are used. For example, FIG. 1 shows four platforms per rack 14 (or 12). A first platform 46 carrying two sensors 22 (one forward-facing and facing the port side 86), a second platform 48 carrying a sensor 22 facing the port side 86, a third platform 50 carrying another sensor 22 facing the port side 86, and a fourth platform 52 carrying a rearward-facing sensor 22 (note: the rack 12 and/or the orientation of sensors 22 on rack 12 may be a mirror-image of the arrangement of rack 14 and/or the orientation of sensors 22 on rack 14).

In other examples, a single platform (per rack) may be used for multiple sensors. For example, instead of having multiple platforms (e.g., 46-52), a unitary-piece platform may couple to the slide rails 58-60 to one another and carry the respective sensors 22. For example, a rectangular base may extend at least partially the length of the slide rails 58-60—e.g., having any suitable shape (e.g., having cut-outs or other shapes which may minimize the weight of the respective platform). Other quantities of sensors, platforms, and/or racks (as well as other designs and configurations) may be used in other examples.

The sensor mount system 10 (e.g., guide rails, slide rails, platforms, etc.) may be comprised of any suitable material— e.g., including metal, plastic, a combination thereof, etc. According to one example, guide rails 24-30, slide rails 54-60, platforms 38-52, etc. are made of aluminum; but of course, this is merely an example. According to this example, the guide and slide rails 24-30, 54-60 may be manufactured using an extrusion process, and the platforms 38-52 may be stamped and/or punched aluminum or the like. Other examples exist.

The sensors 22 coupled to the platforms 38-52 may comprise any suitable electronic sensing or detecting devices. Non-limiting sensor examples include: a digital camera, a thermal imaging device, a radar device, a light ranging and detection (LiDAR) device, a laser range finder, a laser pointing device, and/or an illuminator operating in the visible and/or non-visible wavelengths. According to one example, the sensors 22 include at least two LiDAR devices and at least one digital camera. Further, the sensors 22 may be coupled electronically to a computer 160 which uses data from the respective sensors 22 to autonomously control the vehicle 18. For example, the vehicle 18 may operate in a fully autonomous mode using localization data stored in the computer 160, as well as LiDAR data, digital camera data, radar data, any suitable combination thereof, or the like.

Figure 8:
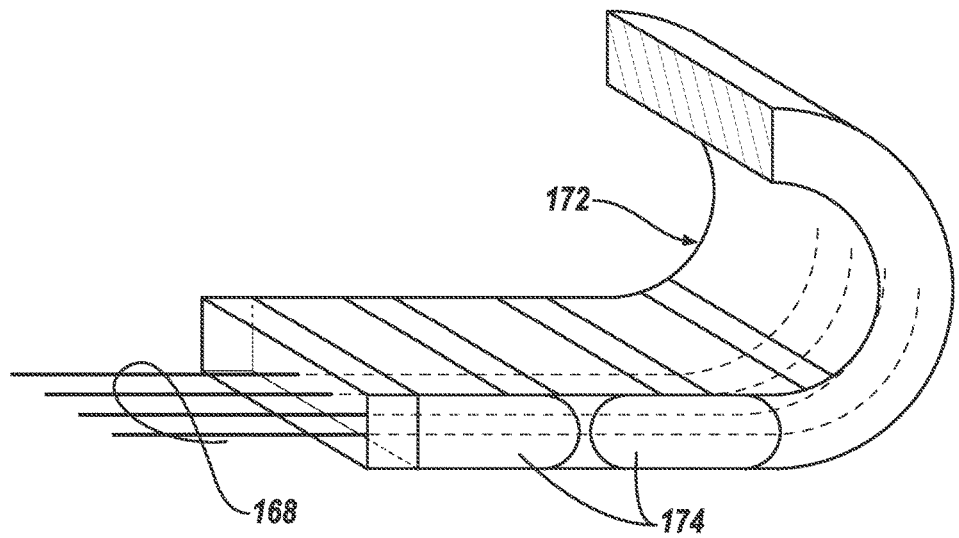
FIG. 8 is a perspective view of an exemplary cable carrier.
Figure 9:
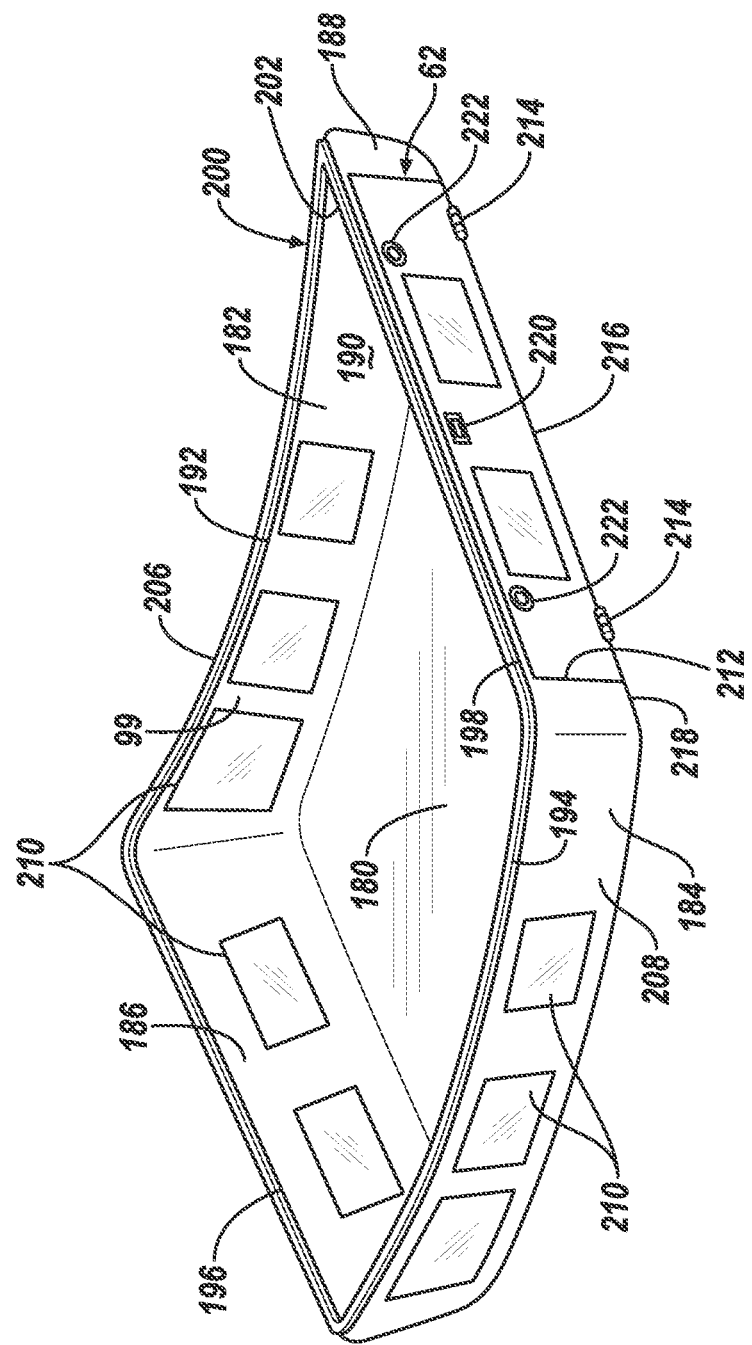
FIG. 9 is a bottom, perspective view of the cover.
Figure 10:
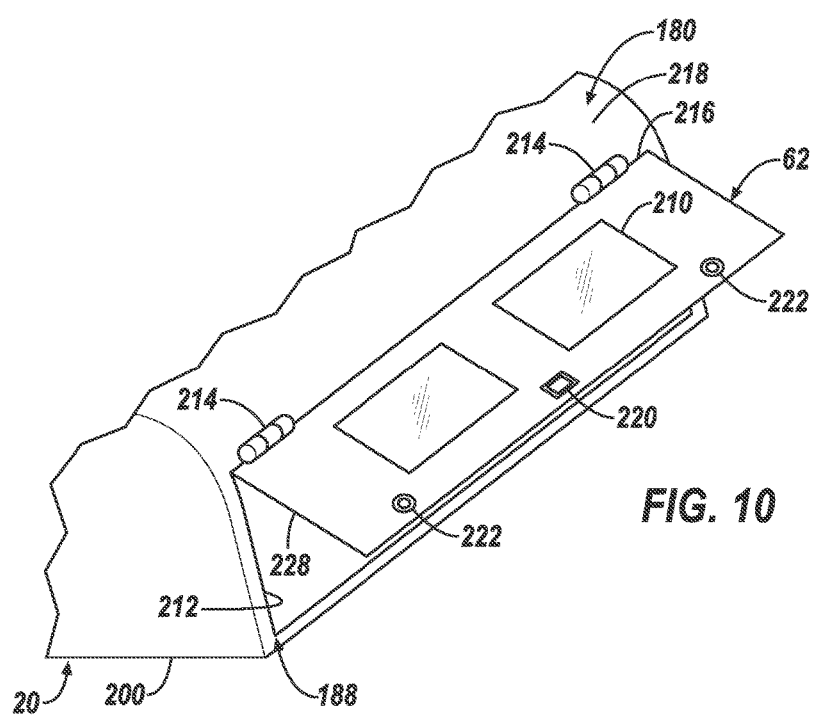
FIG. 10 is a partial perspective view of the cover illustrating an access door.
Figure 11:
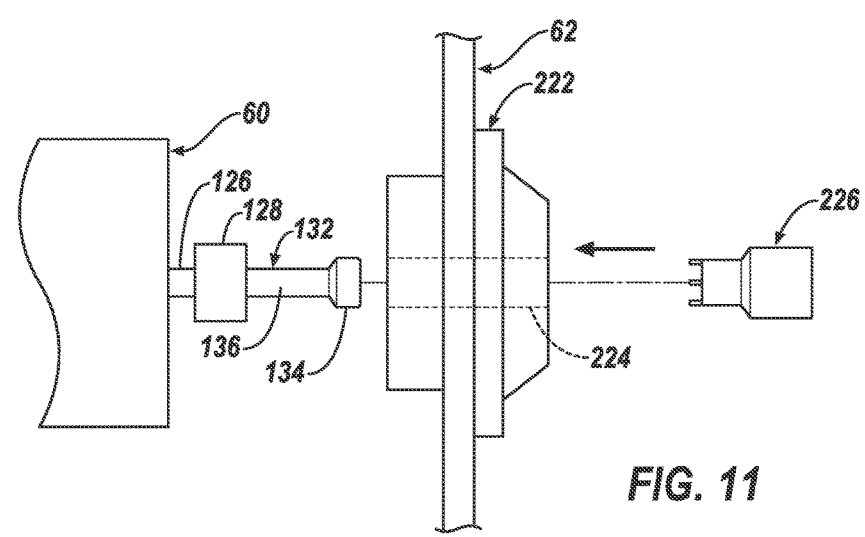
FIG. 11 is an example of a lock mechanism for the door.
Figure 12:
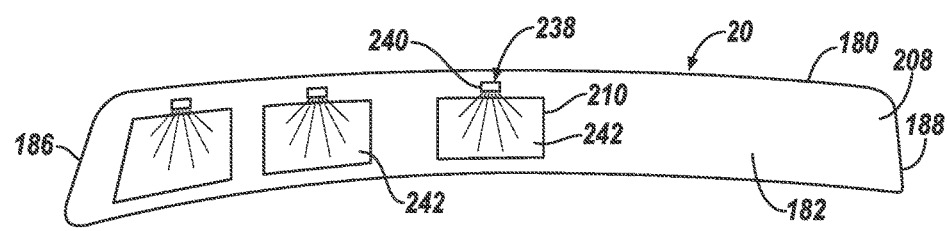
FIG. 12 is a side view of the cover, illustrating nozzles for cleaning respective windows of the cover.

Sensor mount system 10 also may comprise a harness management system 166 that comprises one or more harnesses 168. For example, each sensor 22 may be coupled to computer 160 via an individual harness. Or according to another example, a single harness 168 may be used which has a single connector at the computer 160, but which splits into a plurality of so-called pigtail portions 170 (e.g., each pigtail portion 170 coupling to a different sensor 22). The harness management system 166 may be employed to keep the harness(es) 168 (and/or respective pigtail portions 170) from becoming entangled with one another or with other sensor mount system components—e.g., particularly when the racks 12, 14 are collectively or independently moved between the operational and service-able positions. The harness(es) 168 and/or pigtail portions 170 may collectively and/or individually be carried by cable carriers 172 (see FIG. 8). Cable carriers 172 come in a variety of styles to manage harness location between mechanically moving parts. According to one example, the cable carriers 172 are track-style carriers (e.g., having a plurality of interconnected segments 174 which permit controlled bending of the respective harness—e.g., as the carriages 36, 37 are moved between operational and service-able positions). One non-limiting commercial implementation of a cable carrier includes the IGUS™ E2/000 e-chain™ ; other examples exist.

Turning now to the cover 20 (e.g., see FIGS. 2, 4, 9-14), the cover 20 may comprise an upper wall 180, side walls 182, 184, a vehicle-forward-facing wall 186, and a vehicle-rearward-facing wall 188 collectively arranged to define a cavity 190—e.g., the cover 20, when located adjacent the roof 16, may enclose the racks 12, 14 within the cavity 190. The lower edges 192, 194, 196, 198 of the respective walls 182-188 may define a peripheral edge 200 and an opening 202 to the cavity 190. In some examples, the edge 200 may comprise a seal 206—e.g., so that the racks 12, 14 and sensors 22 may be environmentally sealed from moisture, snow, dust, debris, extreme air temperatures, etc. which may exist at an outer surface 208 of the cover 20.

Any combination of the upper, forward-facing, side, and rearward-facing walls 180-188 188 may comprise one or more windows 210 comprised of any suitable optically transmissive material. According to one non-limiting example, two windows 210 may be located on the forward-facing wall 186, three windows 210 may be located on each respective side wall 182, 184, and two windows 210 may be located on the rearward-facing side 188. The position of the windows 210 may correspond to the locations of sensors 22 (e.g., and the respective corresponding platforms 38-52) carried by the racks 12, 14 when the racks 12, 14 are in the operative position. This arrangement is merely an example; other arrangements exist.

Window material may comprise acrylic or polycarbonate (e.g., so that LiDAR sensors and digital camera sensors may receive imaging data). Or for example, window material could comprise Iridium Antimonide (e.g., to permit thermal imaging device sensors to receive light within the so-called short, medium, or long range thermal wavelengths). Of course, these are merely examples; other suitable materials may be used that may correspond to the optical transmission characteristics of the respective sensor 22.

According to at least one example, the sensor mount system 10 includes the sensors 22. Further, the material of the respective windows 210 corresponds to the optical transmission characteristics of the respectively-located sensors 22—e.g., so the window material does not filter out the detectable wavelengths of the particular sensor.

The rearward-facing wall 188 may comprise an opening 212 for the door 62. The door 62 may comprise at least one hinge 214 that couples an upper region 216 of the door 62 to a rearward region 218 of the upper wall 180. The door may include a lift handle 220 and at least one lock mechanism 222 (e.g., two are shown) which is adapted to receive the lock element 132 of carriage 37 (and/or another lock pin on carriage 36, where applicable). For example, when the door 62 is in an open position, an authorized user may at least partially access the racks 12, 14 and sensors 22 thereon; or e.g., the user may draw either of the racks 12, 14 from the cover 20. In the closed position, the lock mechanism 222 may receive the head 134 of element 132 into a passage 224, and, using a key 226, the user may rotate the key 226 thereby securely gripping the head 134 of element 132 to retain the door 62 in a closed position. One non-limiting commercially available example of the lock mechanism 222 includes the QL-50L-LP/BP manufactured by Quik-Latch.

It should be appreciated that sensors (e.g., such as LiDAR devices) are typically expensive and the cover 20 and lock mechanism(s) 222 may secure the sensors 22 from theft. A periphery 228 of the door 62 sealingly may engage the rearward-facing wall 188 (e.g., and/or portions of the upper and/or side walls 180-184) to inhibit moisture, snow, dust, debris, extreme air temperatures, etc. from entering the cavity 190.

Other examples of the system 10 described above also exist. According to one example, the cover 20 comprises a fluid system 238 (e.g., comprising pumps, reservoirs, passages, valves, etc. (not shown) and at least one fluid nozzle 240 proximate to at least one of the windows 210; see FIG. 12)—e.g., for spraying pressurized liquid or gas on an exterior surface 242 of the window 210.

Figure 13:
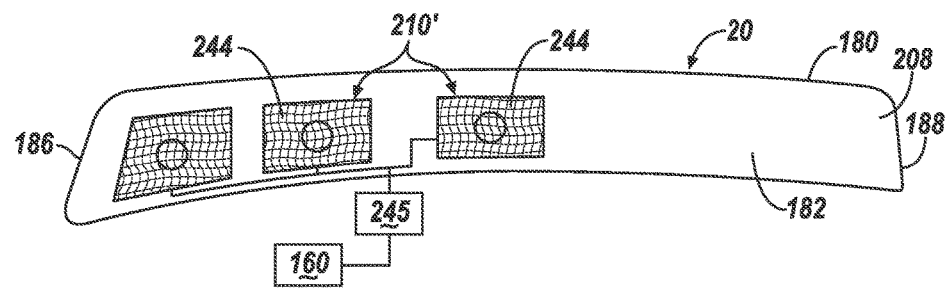
FIG. 13 is a side view of the cover, illustrating windows having respective heating elements.

According to another example, a window 210' may be used that comprises one or more heating elements 244 (FIG. 13). For example, the elements 244 be coupled to an electrical circuit 245 and further coupled to computer 160 such that when the circuit 245 is actuated by the computer 160, the elements 244 are heated to remove ice, snow, etc. from the respective windows 210'.

Figure 14:
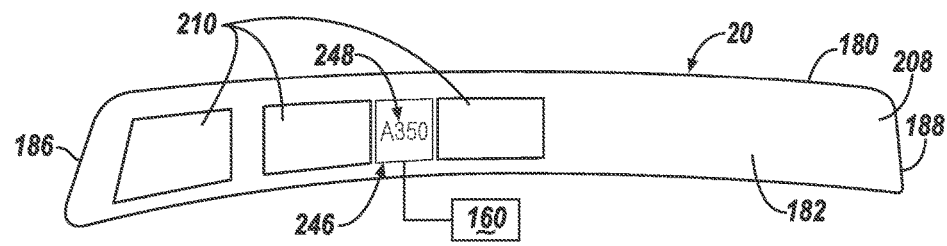
FIG. 14 is a side view of the cover, illustrating a display carried by the cover.

According to another example, at least one display 246 is carried by the cover 20 (FIG. 14). The display 246 may output an identifier 248 which may be used to assist occupants using the vehicle 18 as an autonomous-taxi or other shared-ride vehicle. For example, an person requesting a taxi-ride may identify the vehicle 18 as his/her anticipated ride using the identifier 248 shown on display 246. The computer 160 may control which identifier is displayed, whether the display 246 is illuminated, etc. According to at least one example, the display 246 is interposed between two of the windows 210 on one or more of the forward-facing wall 186, side wall 182, side wall 184, and/or rearward-facing wall 188; of course, other examples exist as well.

Figure 15:
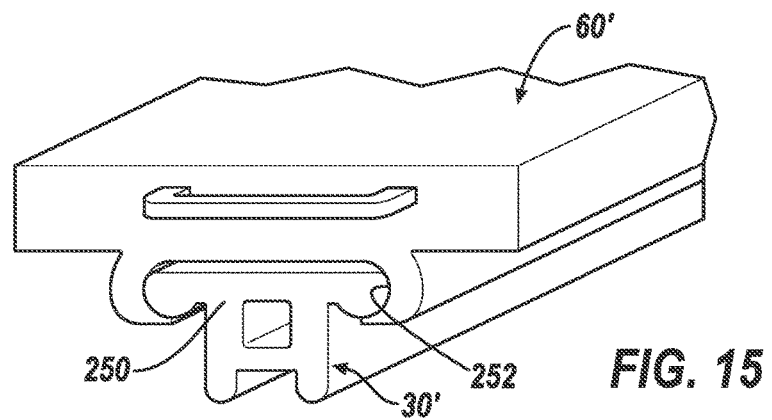
FIGS. 15-17 illustrate additional examples of rails which may be used with the sensor mounting racks.
Figure 16:
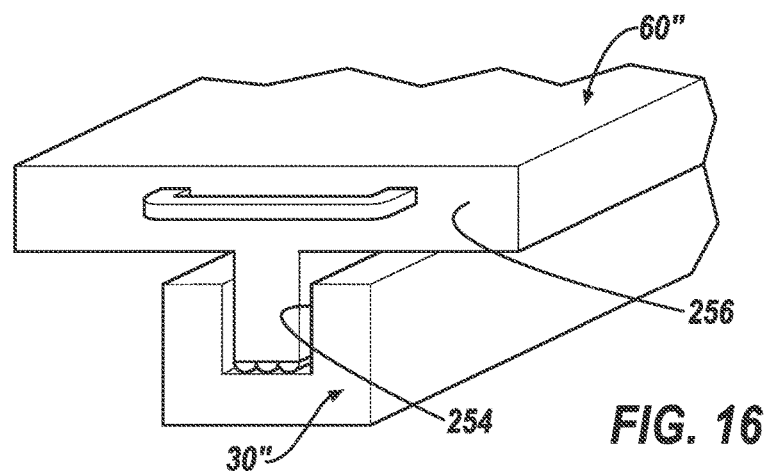
Figure 17:
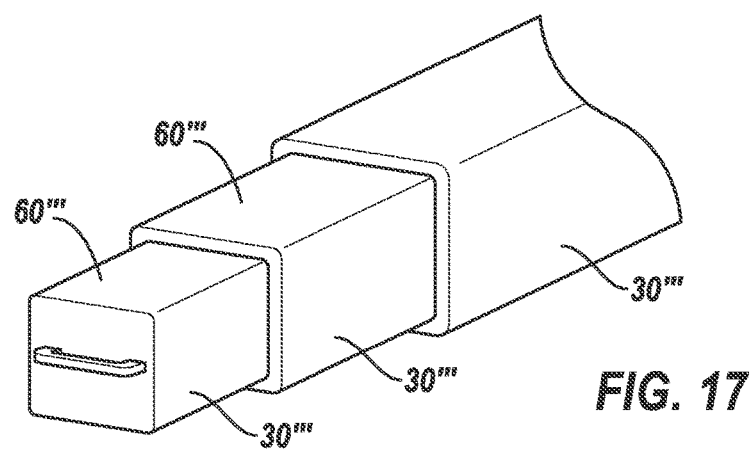

According to other examples, the shape and configuration of any of the guide and/or slide rails may differ. For example, a cross-section of a guide rail 30' may have a T-shaped portion 250 and a corresponding slide rail 60' may have a channel 252 that slidably receives the T-shaped portion 250 (FIG. 15). Or for example, a guide rail 30" may have a longitudinally extending channel 254, and a corresponding slide rail 60" may have an axially-extending protrusion 256 sized to slide within the channel 254 without interference (FIG. 16). Or for example, as shown in FIG. 17, a plurality of guide rails 30''' and a plurality of slide rails 60''' may be formed as telescopic rail (e.g., wherein each slide rail 60''' also serves as a guide rail 30''' for a diametrically smaller slide rail 60'''). These are merely examples; still other rail examples exist.

Thus, there has been described a sensor mount system for a vehicle. The system may include one or more sensor racks adapted to carry and carrying one or more sensors within a cover. The cover may be located in any suitable location on the vehicle; and in one example, it is mounted to a roof thereof. The cover comprises a door through which the rack(s) can be independently moved into and out of the cover.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more customer integrated circuits, etc. The processor can receive the data from the sensors and determine, from the data, how to suitably operate the vehicle 18 in a fully autonomous mode. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A sensor mount system, comprising:
    a vehicle sensor cover having a plurality of walls defining a cavity, wherein at least one of the plurality of walls comprises a window; and
    a movable rack, within the cavity, having a platform, wherein, when the rack is in an operative position, a location of the platform corresponds with a location of the window.

2. The system of claim 1, wherein the rack comprises a plurality of platforms, wherein the cover comprises a plurality of windows, wherein, when the rack is in the operative position, the respective locations of the platforms correspond to the respective locations of the windows.

3. The system of claim 1, wherein the cover comprises an opening for a door, wherein, when the door is in an open position, the rack is movable through the opening to a service-able position.

4. The system of claim 3, wherein the door comprises a locking mechanism that couples to the movable rack.

5. The system of claim 4, wherein the rack further comprises a slide rail for supporting a sensor, the rail comprising a lock element, wherein the mechanism engages the element to retain the door in a locked position.

6. The system of claim 1, wherein the system comprises a first movable rack and a second movable rack, wherein the first movable rack moves independently of the second movable rack.

7. The system of claim 6, wherein each of the first and second movable racks include at least one sensor which provides data to a computer programmed to operate a vehicle, comprising the system, in a fully autonomous mode.

8. The system of claim 1, wherein the rack comprises at least one slide rail coupled to the platform and at least one guide rail, wherein the at least one slide rail moves relative to the at least one guide rail.

9. The system of claim 8, wherein the system further comprises a vehicle roof comprising a plurality of cross-members, wherein the at least one guide rail is coupled to at least some of the plurality of cross-members.

10. The system of claim 9, wherein at least one of the plurality of cross-members is a non-pillared cross-member.

11. The system of claim 8, wherein the system comprises a first rack and a second rack, wherein each of the first and second racks comprise a pair of guide rails and a pair of slide rails, wherein the first rack is arranged as a mirror-image of the second rack.

12. The system of claim 8, wherein the at least one guide rail is coupled to a first wall of the cover, wherein the at least one slide rail is movable through an opening in a second, opposite wall.

13. The system of claim 8, wherein the at least one slide rail comprises a hinge-able segment so that, when the rack is in a service-able position, a first portion of the at least one slide rail is pivoted relative to a second portion thereof.

14. The system of claim 1, wherein the cover comprises at least one fluid nozzle positioned to apply a fluid to the window.

15. The system of claim 1, wherein the window comprises at least one of the following: an acrylic material, a polycarbonate material, an Indium Antimonide material, or a heating element.

16. The system of claim 1, wherein the cover comprises a display.

17. A sensor mount system, comprising:
- a cover having a plurality of walls defining a cavity, wherein at least one of the plurality of walls comprises a window; and
- a sensor mounting rack, located within the cavity, coupled to both a roof of a vehicle and the cover, having a platform, wherein, when the rack is in an operative position, a location of the platform corresponds with a location of the window.

18. The system of claim 17, wherein the rack comprises a plurality of sensors, wherein the cover comprises a plurality of windows, wherein, when the rack is in the operative position, the respective locations of the sensors correspond to the respective locations of the windows.

19. The system of claim 17, wherein the cover comprises an opening for a door, wherein, when the door is in an open position, the rack is movable through the opening to a service-able position.

20. The system of claim 17, wherein the system comprises a plurality of racks, wherein each of a first rack and a second rack comprise a pair of guide rails and a pair of slide rails, wherein the first rack is arranged as a mirror-image of the second rack.

* * * * *